United States Patent [19]

Maile

[11] Patent Number: 4,761,822
[45] Date of Patent: Aug. 2, 1988

[54] BURST-MODE TWO-WAY RADIO COMMUNICATIONS SYSTEM

[75] Inventor: Graham L. Maile, Chesterton, England

[73] Assignee: Libera Developments Ltd., London, England

[21] Appl. No.: 897,711

[22] Filed: Aug. 18, 1986

[30] Foreign Application Priority Data

Aug. 23, 1985 [GB] United Kingdom ................. 8521159

[51] Int. Cl.$^4$ ............................................. H04B 1/74
[52] U.S. Cl. ........................................ 455/82; 455/83; 455/272; 455/277; 379/58
[58] Field of Search .................... 455/49, 54, 73, 89, 455/82, 83, 103, 129, 272, 277; 379/58, 61; 370/24, 32

[56] References Cited

U.S. PATENT DOCUMENTS 4,549,311 10/1985 McLaughlin ...................... 455/277

FOREIGN PATENT DOCUMENTS 166551 1/1986 European Pat. Off. .............. 455/82

Primary Examiner—Michael A. Masinick
Attorney, Agent, or Firm—Oldham, Oldham & Weber Co.

[57] ABSTRACT

A burst-mode two-way radio communications system in which a plurality of antennas at a base station share a branched antenna switched dependent on the strength of the signal received from a portable transceiver, wherein a switch controller controls operation of one or more branch selection switches on the basis of an instructing signal received from any one of the base station transceivers.

9 Claims, 4 Drawing Sheets

BURST-MODE TWO-WAY RADIO COMMUNICATIONS SYSTEM

FIELD OF THE INVENTION

This invention relates to a burst-mode two-way radio communications system and more especially to a burst-mode duplexed cordless telephone system.

BACKGROUND TO THE INVENTION

It is known practice in radio communications systems of the type referred to for the base station transceiver or each such transceiver to communicate with the remote portable transceiver, e.g. a handset, via an antenna arrangement which includes two or more branches, with the transceivers controlling switching between the branches for maintenance of reliable communication.

Hitherto, either each base station transceiver has had its own diverse (branched) antenna arrangement, or each transceiver has been able to switch independently of the others between the branches of a common diverse antenna.

OBJECT OF THE INVENTION

It is a disadvantage of the known arrangements that considerable cost is involved in the antenna system, either because of the number of diverse antennas which have to be provided or because relatively complex signal combining and switching arrangements are required when a common diverse antenna is used. Moreover, in the preferred situation wherein a common diverse antenna is employed, the complex switching facilities tend to lead to signal degradation. An object of this invention is to provide a burst-mode two-way radio communications system wherein a relatively less expensive antenna arrangement is provided and signal degradation due to branch switching is minimised, albeit for a restricted number of base station transceivers.

THE INVENTION

According to the invention, there is provided a burst-mode two-way radio communications system wherein a plurality of transceivers at a base station share a common antenna arrangement having a plurality of antenna branches and antenna branch selection is made by an operative base station transceiver having regard to the strength of the signal received from a portable transceiver with which communication is established, and wherein antenna branch selection is effected by one or more switches controlled by a switch controller which is connected to all the base station transceivers to be able to receive from any one of them a signal which instructs antenna branch selection.

The invention may be practised with a plurality of switches, one for each base station transceiver, controlled by a switch selector which, while being responsive to an instructing signal received from any one of the base station transceivers, acts to control all the switches simultaneously, so that at any given time all the transceivers are connected to the same antenna branch.

More preferably, especially when the number of base station transceivers does not exceed four, a single switch is controlled by an OR selector. In this arrangement all the base station transceivers have a common connection to the switch, while the OR selector responds to instructing signals received from any one of such transceivers.

DESCRIPTION OF EMBODIMENTS

Figure 1:
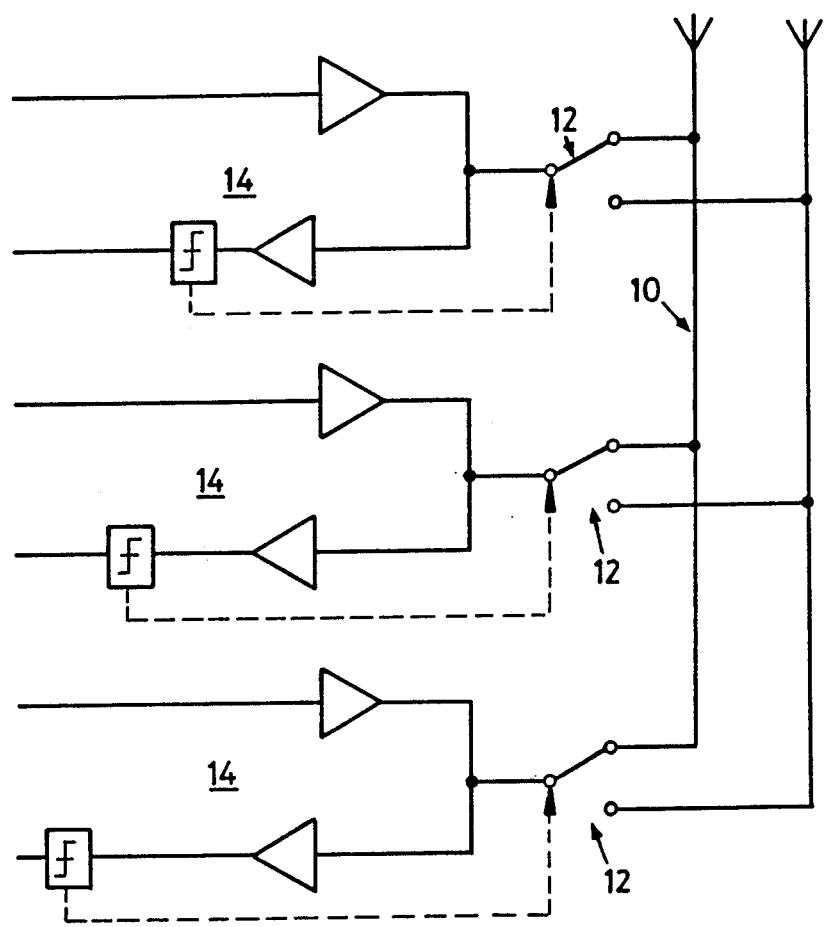
FIG. 1 is a simplified circuit diagram of a prior art two-way radio communications system having independent switching for each base station transceiver.

The prior art system of FIG. 1 is disadvantageous in that, in practice, relatively complex signals combining circuits are required in the primary antenna branch 10 and, coupled with the requirement for a plurality of independent switches 12, one for each transceiver 14, degradation of the signal can occur.

Figure 2:
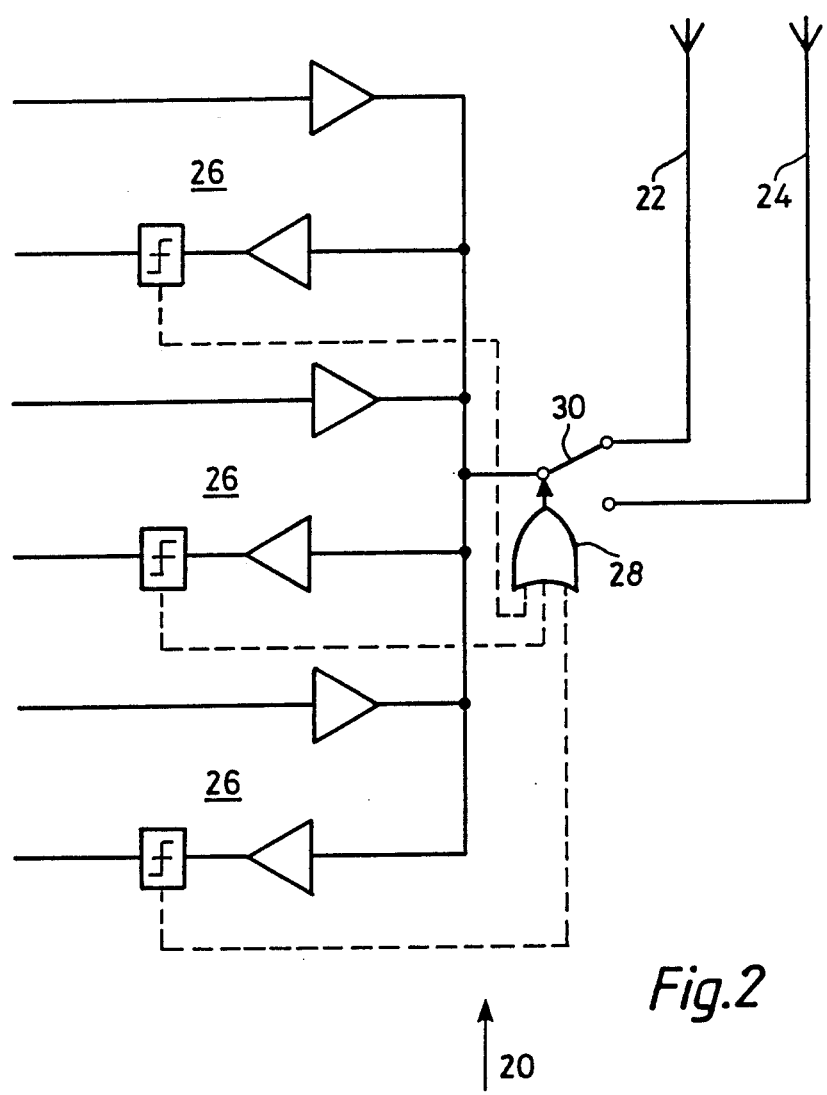
FIGS. 2 and 3 are corresponding circuit diagrams for alternative systems in accordance with the invention.
Figure 3:
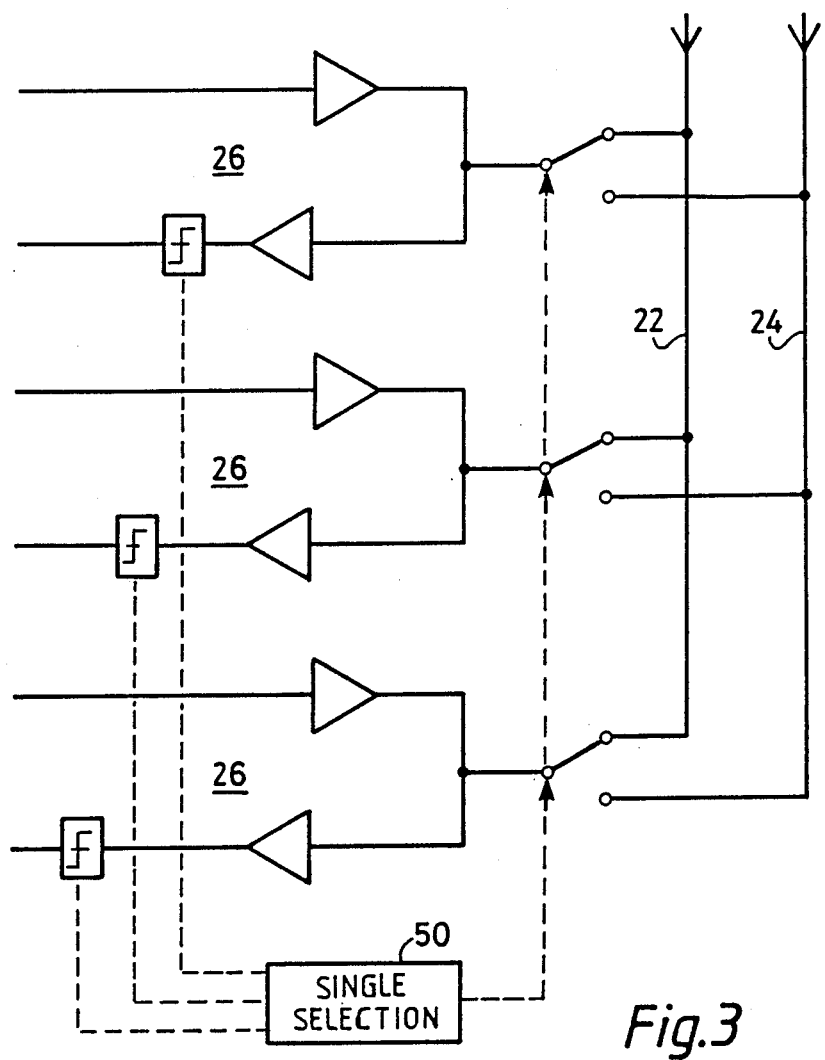

Both of the following arrangements now to be described afford very useful gains (up to a factor of ten) for a high grade of service provided that the number of base station transceivers does not exceed four in the case of OR circuit selection (FIG. 2) and eight in the case of single auxiliary switched selection (FIG. 3). The circuit of FIG. 2 also offers considerable cost savings in requiring only one antenna branch selection switch, whilst even in the circuit of FIG. 3 the auxiliary branch does not require the relatively complex signal combining circuits necessary in the primary branch of the prior art system.

Figure 4:
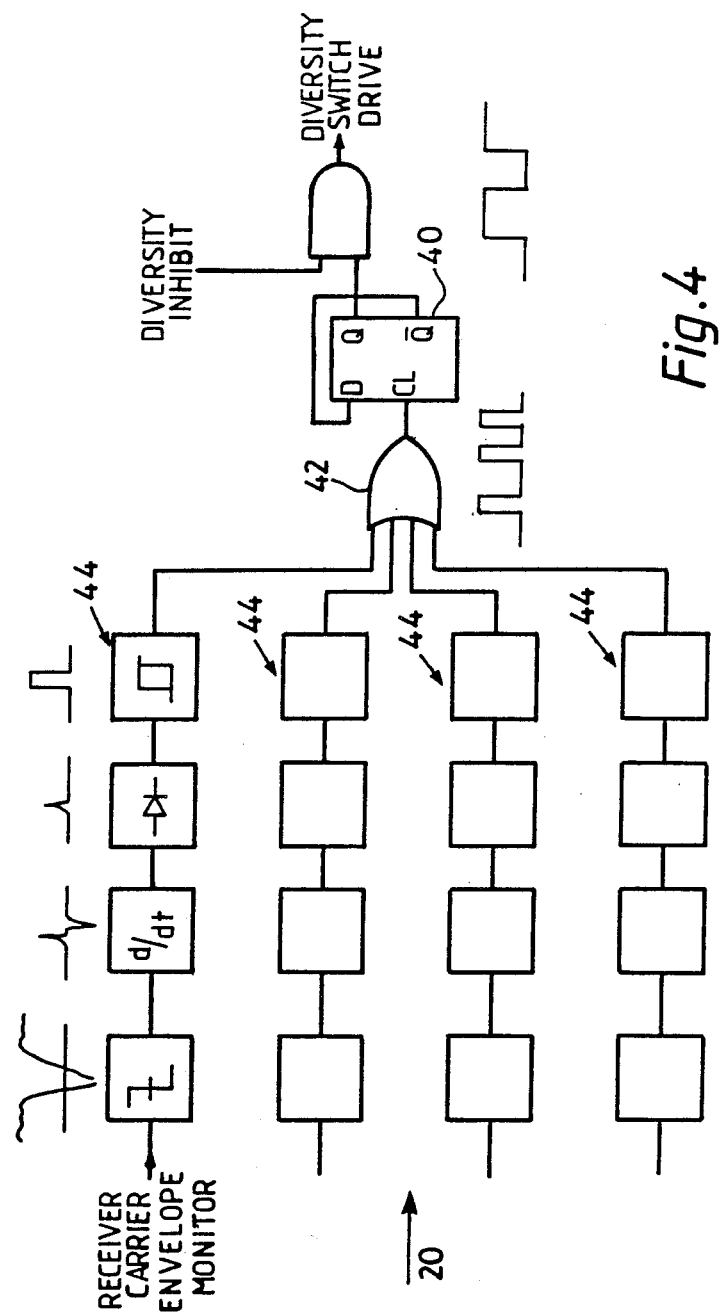
FIG. 4 is a more detailed circuit diagram corresponding to the system of FIG. 2.

The arrangements of FIGS. 2 to 4 are especially suited to two-way radio communication systems where a base station having N transceivers communicates with remote transceivers in the form of portable handsets in a burst-mode duplexed cordless telephone system. For a burst-mode system, reciprocity of the propagation path between base unit and handset is assumed to apply in the short-term (several burst periods) so the base unit can, on the basis of the received handset signal, select the branch for transmission. This is understood, and is one reason why a burst-mode system is employed.

The system shown in FIG. 2 employs two-branch selection diversity at the base terminal. The base terminal 20 possesses two antennas 22, 24 shared by the three local transceivers (Tx/Rx), referenced 26. The selection of the branches is based on an OR selector 28, that is, any transceiver 26 is able to switch the branch 22, 24 used for transmission and reception by the four transceivers.

This form of diversity is a low cost alternative to independent selection, which requires N switches and a two N-way antenna combining network. The following considerations apply in respect of performance.

A system designed to achieve a probability that the signal will be greater than the Rayleigh fading threshold 95% of the time without diversity will achieve a corresponding service performance of between 99.90 and 99.95% with two-branch diversity when operating with a single handset. This represents a performance improvement factor of 50 to 100. The range stated for the improvement represents the uncertainty in the branch correlation, which is a function of the antenna spacing and the local electromagnetic environment.

In an independent selection scheme this advantage is maintained, irrespective of the number of active handsets.

In the OR selection configuration the advantage reduces as the number of handsets is increased. In the worst-case situation where all handsets are on the boundary, the probabilities quoted above with N=4 become:

| Number of active handsets | Service performance (zero correlation) |
|---|---|
| 1 | 99.95 |
| 2 | 99.80 |
| 3 | 99.50 |
| 4 | 99.10 |

This compares with a 95% service performance with no diversity.

In a truly Rayleigh multipath situation, the antenna correlation reduces, and the performance improves, as the antenna separation is increased from zero to a quarter wavelength. Hence a quarter wavelength (87 mm) spacing will preferably be employed, with facility for adjusting this spacing to compensate for perturbations on the theoretical value. Odd multiples of a quarter wavelength can be used if this is mechanically more convenient or if the mutual coupling introduced by the quarter wavelength spacing limits antenna performance.

A Tx/Rx will switch antenna when the received signal (carrier) level falls below a prescribed absolute value, monitored by the local receiver or a signal-to-interference monitor. If desired, this level may be externally adjustable in software to allow optimisation. In practice the level will usually correspond to the point where the worst-case service performance figure is achieved, i.e. approximately 15 dB below the median signal at maximum range (microcell boundary) and without Rayleigh fading.

An alternative method of sensing the occurrence of a signal fade is to sample the received signal with a suitable sample-and-hold circuit, and monitor the rate of change of sucessive samples. A fade is then characterised by a rapid rate of change compared with long-term changes in the mean signal averaged over typically several seconds. In the practical embodiment, the received signal is monitored for the presence of corrupted bits of information, the extent of which are correlated with the monitored rate of change to indicate the presence of a fade. By this system, the reliability of the decision that a fade is sufficiently significant to initiate the diversity switching is enhanced.

FIG. 4 shows the OR-selection system in more detail, in respect of a base station having four transceivers 26.

The switch will transfer the set of transceivers from one branch to the second branch in a time the word which corresponds to no more than one bit of speech. The Tx/Rx will then dwell on that branch until a further fade is experienced and the decision is made to switch back to the first branch. This scheme can be implemented logically as a SPDT switch 30 (in FIG. 2) whose state is changed by the output of a bistable 40 triggered by the threshold detectors 44, as shown in FIG. 4. In the event of two or more fades occurring exactly together there will be a switch state change. When there is a finite separation in time between the start of two or more fades, but fades overlap, the switching will only effectively occur for one fade. Situations where two changes of state occur in a very short period (for instance, a few bits) but where the fades do not overlap, may be suppressed.

The diversity is activated only once a handset and base terminal have been coupled to prevent "oscillation" between branches. In this connection, it is possible for both branches to receive signals below the threshold if:

a fade is abnormally spacially broad and stationary
the handset is out of range
the handset is in a shadow.

In this event the diversity is de-activated once the number of oscillations exceeds a pre-defined limit in a given time duration.

In the practical embodiment the system operates at a carrier frequency of approximately 850 MHz (not critical) and uses digital coding and modulation of the speech signal. The fixed part (base unit) and portable part (handset) communicate in a duplex sense by alternate transmission. The coded transmission rate is 72 kbit/s (not critical) and the burst period in each direction 2 ms (not critical).

It can be shown that a useful gain in signal quality is obtained using a single switch to select the antenna branch for transmission and reception in a multi-transceiver base unit. In the case shown, the system employs two-branch antenna diversity; it could be more (in which case the switch becomes multi-throw).

The alternative system of FIG. 3 employs single selection diversity and can give good performance where the number of base station transceivers is at least as great as eight. In this figure, the switch selector referenced 50 allows only one of the N transceivers to utilise the auxilary branch referenced 24 at a given instant. This auxiliary branch does not contain the combining network associated with the primary branch 22.

Various modifications of the above-described arrangement are possible within the scope of the invention hereinbefore defined.

I claim:

1. A burst-mode two-way radio communications system comprising a plurality of transceivers and a base station, a common antenna arrangement shared by said transceivers, said antenna arrangement having a plurality of antenna branches being separated by a spacing, and at least one portable transceiver, wherein antenna branch selection is made by an operative base station transceiver having regard to the strength of the signal received from a portable transceiver with which communication is established, said system also comprising at least one switch at which antenna branch selection is effected, a switch controller for controlling operation of said at least one switch, and circuit means connecting said switch controller to all the base station transceivers to enable said controller to receive from any one of said transceivers a signal which instructs antenna branch selection.

2. A burst-mode two-way radio communication system according to claim 1, comprising a plurality of switches, one for each base station transceiver, and wherein the switch controller comprises a switch selector for controlling said switches, and said circuit means connecting said switch controller so that said selector is responsive to a instructing signal received from any one of the base station transceivers and further circuit means whereby said selector acts to control all the switches simultaneously, so that at any given time all the transceivers are connected at the same antenna branch.

3. A burst-mode two-way radio communications system according to claim 1, comprising a single switch, and wherein said switch controller is an OR selector, all the base station transceivers have a common connection to the switch, and the circuit means enables the OR selector to respond to instructing signals received from any one of such transceivers.

4. A burst-mode two-way radio communications system according to claim 1, wherein the common antenna arrangement has two branches.

5. A burst-mode two-way radio communications system according to claim 1, wherein the antenna spacing is adjustable.

6. A burst-mode two-way radio communications system according to claim 1, including means for monitoring the level of the signal received at a transceiver and for causing the antenna branch to be switched dependently on said signal level falling below an adjustable absolute value.

7. A burst-mode two-way radio communications system according to claim 6, wherein the monitoring means comprises means to sample-and-hold the received signal and monitor the rate of change of successive samples.

8. A burst-mode two-way radio communications system according to claim 7, wherein the monitoring means also includes means for examining the received signal for corrupted information and for correlating the extent of corrupted information with the monitored rate of change of the signal in order to determine antenna branch switching.

9. A burst-mode two-way radio communications system according to claim 1, further comprising portable transceivers associated with each base station transceiver, operating with a carrier signal and a speech signal subject to digital coding and modulation, the base station transceivers and portable transceivers communicating by alternate transmission with a time limited burst period in each direction, and wherein the at least one switch accomplishes antenna branch selection in a period of time which does not exceed one bit of the coded speech signal.

* * * * *